(12) United States Patent
Lee et al.

(10) Patent No.: US 9,632,482 B2
(45) Date of Patent: Apr. 25, 2017

(54) SUB-HOLOGRAM GENERATION METHOD AND APPARATUS FOR HOLOGRAPHIC DISPLAY

(71) Applicant: SAMSUNG ELECTRONICS CO., LTD., Suwon-si, Gyeonggi-do (KR)

(72) Inventors: Seok Lee, Hwaseong-si (KR); Dong Kyung Nam, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 141 days.

(21) Appl. No.: 14/328,227

(22) Filed: Jul. 10, 2014

(65) Prior Publication Data

US 2015/0146271 A1 May 28, 2015

(30) Foreign Application Priority Data

Nov. 28, 2013 (KR) .................. 10-2013-0146102

(51) Int. Cl.
*G03H 1/08* (2006.01)
*G03H 1/26* (2006.01)
*G03H 1/22* (2006.01)

(52) U.S. Cl.
CPC ................ *G03H 1/0808* (2013.01)

(58) Field of Classification Search
CPC .......... G03H 1/26; G03H 1/30; G03H 1/2294; G03H 2001/303; G03H 1/08; G03H 1/0808; G03H 2001/2242; G03H 1/0891; G03H 1/268; G03H 1/22; G03H 2001/0816; G03H 2001/306
USPC ............... 359/23, 25, 9, 10, 32, 35
See application file for complete search history.

(56) References Cited

U.S. PATENT DOCUMENTS

| | | |
|---|---|---|
| 6,975,786 B1 | 12/2005 | Warr et al. |
| 7,307,767 B2 | 12/2007 | Gerspach et al. |
| 7,768,684 B2 | 8/2010 | Cameron et al. |
| 7,898,924 B2 | 3/2011 | Bates et al. |
| 7,969,849 B2 | 6/2011 | Sütö et al. |
| 8,085,453 B2 | 12/2011 | Christmas et al. |
| 2006/0139711 A1 | 6/2006 | Leister et al. |
| 2010/0253677 A1 | 10/2010 | Kroll et al. |
| 2013/0022222 A1 | 1/2013 | Zschau et al. |
| 2013/0222873 A1* | 8/2013 | Kwon ................ G03H 1/08 359/9 |

FOREIGN PATENT DOCUMENTS

| | | |
|---|---|---|
| JP | 10-171336 | 6/1998 |
| JP | 2008-159200 | 7/2008 |
| JP | 2009-145646 | 7/2009 |
| KR | 10-2013-0042859 | 4/2013 |

* cited by examiner

*Primary Examiner* — Jade R Chwasz
(74) *Attorney, Agent, or Firm* — NSIP Law

(57) ABSTRACT

A sub-hologram generation method and an apparatus for a hologram display are provided, the apparatus including at least a first calculation unit configured to calculate a size of a first sub-hologram area corresponding to a first hologram object using a user viewing window, a second calculation unit configured to calculate a size of a second sub-hologram area corresponding to the first hologram object based on a size of a display pixel, and a determiner configured to compare the size of the first sub-hologram area and the size of the second sub-hologram area, and to determine a sub-hologram area corresponding to the first hologram object based on a result of the comparing.

12 Claims, 8 Drawing Sheets

SUB-HOLOGRAM GENERATION METHOD AND APPARATUS FOR HOLOGRAPHIC DISPLAY

CROSS-REFERENCE TO RELATED APPLICATIONS

This application claims the priority benefit of Korean Patent Application No. 10-2013-0146102, filed on Nov. 28, 2013, in the Korean Intellectual Property Office, the disclosure of which is incorporated herein by reference.

BACKGROUND

1. Field

Example embodiments of the following description relate to a sub-hologram generation method and apparatus for a holographic display, and more particularly, to a method of determining a hologram area to reduce a complexity of the hologram display.

2. Description of the Related Art

A digital hologram generation method refers to a process that may acquire a hologram pattern, or a fringe pattern, by approximating optical signals and performing a mathematical operation through an operation device. In the digital hologram generation method, a three-dimensional (3D) object may be considered an aggregate in that a point-hologram of each point included in the 3D object may be calculated and summed, thereby acquiring a hologram pattern of the 3D object. Thus, a complexity and number of calculations to acquire the 3D object may be determined based on a number of 3D points to be expressed. When a number of points required to express the 3D object is increased, an excessive number of calculations may be required, and thus, the generating of a real time hologram may be difficult.

Additionally, a viewing angle may be a significant element for generating a hologram. To generate the hologram, light may be diffracted from a spatial light modulator (SLM) so as to bring about an offset or constructive interference. In this instance, a diffraction angle of the light may be inversely proportional to a size of a pixel of the SLM. However, limitations on physically reducing the size of the pixel of the SLM may exist, and thus, extending a viewing angle in a hologram display may also be difficult.

SUMMARY

The foregoing and/or other aspects are achieved by providing a hologram generation apparatus including a first calculation unit configured to calculate a size of a first sub-hologram area corresponding to a first hologram object using a user viewing window, a second calculation unit configured to calculate a size of a second sub-hologram area corresponding to the first hologram object based on a size of a display pixel, and a determiner configured to compare the size of the first sub-hologram area and the size of the second sub-hologram area, and determine a sub-hologram area corresponding to the first hologram object based on a result of the comparing.

The first calculation unit may calculate the size of the first sub-hologram area based on geometrical relationships among a size and a position of the user viewing window, and a position of the first hologram object.

The second calculation unit may calculate the size of the second sub-hologram area in consideration of a sampling limit determined based on the size of display pixel.

The first calculation unit and the second calculation unit may also calculate a position of the first sub-hologram area and a position of the second sub-hologram area.

The determiner may determine, to be the sub-hologram area, a sub-hologram area on which a number of calculations performed for generating a hologram pattern is minimized between the first sub-hologram area and the second sub-hologram area.

The determiner may determine, to be the sub-hologram area, a sub-hologram area having a minimum size between the first sub-hologram area and the second sub-hologram area.

The hologram generation apparatus may further include a hologram generator configured to generate a point-hologram with respect to the determined sub-hologram area, and generate a hologram pattern by accumulating the generated point-hologram.

Further, the size of the second sub-hologram area may be determined as shown in the Equation below:

$$\text{Size of sub-hologram area} = \frac{\lambda \cdot z}{2p}$$

such that $\lambda$ denotes a wavelength of light, p is determined during fabrication of a spatial light modulator (SLM), and z denotes a vertical distance between the first hologram object and a surface of the SLM.

Additionally, the area satisfying a Nyquist sampling may be determined to be the second sub-hologram area, thereby preventing an occurrence of degradation in an image.

The point-hologram pattern generated by determining the second sub-hologram area may provide an increased clarity in comparison to a point-hologram pattern generated with respect to an entire spatial light modulator (SLM) area.

The foregoing and/or other aspects are achieved by providing a hologram generation apparatus including a selecting unit configured to select, based on a position of a hologram object relative to a display, one of a first method for determining a sub-hologram area using a user viewing window and a second method for determining the sub-hologram area based on a size of a display pixel, and a determiner configured to determine the sub-hologram area corresponding to a first hologram object based on the selected method.

The selecting unit may compare the position of the hologram object and a preset threshold position, and select one of the first method and the second method based on a result of the comparing.

The preset threshold position may correspond to the position of the hologram object in which a size of a sub-hologram area, determined using the first method, is greater than a size of a sub-hologram area determined using the second method.

The selecting unit may select the first method when the hologram object is positioned within a distance less than the preset threshold position.

The selecting unit may select the second method when the hologram object is positioned in a distance greater than or equal to the preset threshold position.

The hologram generation apparatus may further include a hologram generator configured to generate a point-hologram with respect to the determined sub-hologram area, and generate a hologram pattern by accumulating the generated point-hologram.

The size and the position of the user viewing window may be determined in advance of determining a size of the sub-hologram area, and the size of the sub-hologram area may be determined based on a position of the sub-hologram area.

The foregoing and/or other aspects are achieved by providing a hologram generation apparatus including a first area determiner configured to determine a first sub-hologram area corresponding to a first hologram object using a user viewing window, a second area determiner configured to determine a second sub-hologram area corresponding to the first hologram object based on a size of a display pixel, and a determiner configured to compare a size of the first sub-hologram area and a size of the second sub-hologram area, and to determine a sub-hologram area corresponding to the first hologram object based on a result of the comparing.

The foregoing and/or other aspects are achieved by providing a sub-hologram determination method including calculating a size of a first sub-hologram area corresponding a first hologram object using a user viewing window, calculating a size of a second sub-hologram area corresponding to the first sub-hologram object based on a size of a display pixel, and comparing the size of the first sub-hologram area and the size of the second sub-hologram area, and determining a sub-hologram area corresponding to the first hologram object based on a result of the comparing.

The determining may include determining, as the sub-hologram area, a sub-hologram area on which a number of calculations performed for generating a hologram pattern is minimized between the first sub-hologram area and the second sub-hologram area.

The determining may include determining, to be the sub-hologram area, a sub-hologram area having a minimum or smaller size between the first sub-hologram area and the second sub-hologram area.

The foregoing and/or other aspects are achieved by providing a sub-hologram determination method including comparing a preset threshold position and a position of a hologram object relative to a display, selecting one of a first method of determining a sub-hologram area using a user viewing window and a second method of determining a sub-hologram area based on a size of a display pixel, based on a result of the comparing, and determining a sub-hologram area corresponding to a first hologram object using the selected method.

The preset threshold position may correspond to the position of the hologram object in which a size of a sub-hologram area, determined using the first method, is greater than a size of a sub-hologram area determined using the second method.

The selecting may include selecting the first method when the hologram object is positioned within a distance less than the preset threshold position, and selecting the second method when the hologram object is positioned in a distance greater than or equal to the preset threshold position.

Additional aspects of example embodiments will be set forth in part in the description which follows and, in part, will be apparent from the description, or may be learned by practice of the disclosure

BRIEF DESCRIPTION OF THE DRAWINGS

These and/or other aspects will become apparent and more readily appreciated from the following description of example embodiments, taken in conjunction with the accompanying drawings of which.

DETAILED DESCRIPTION

Figure 1:
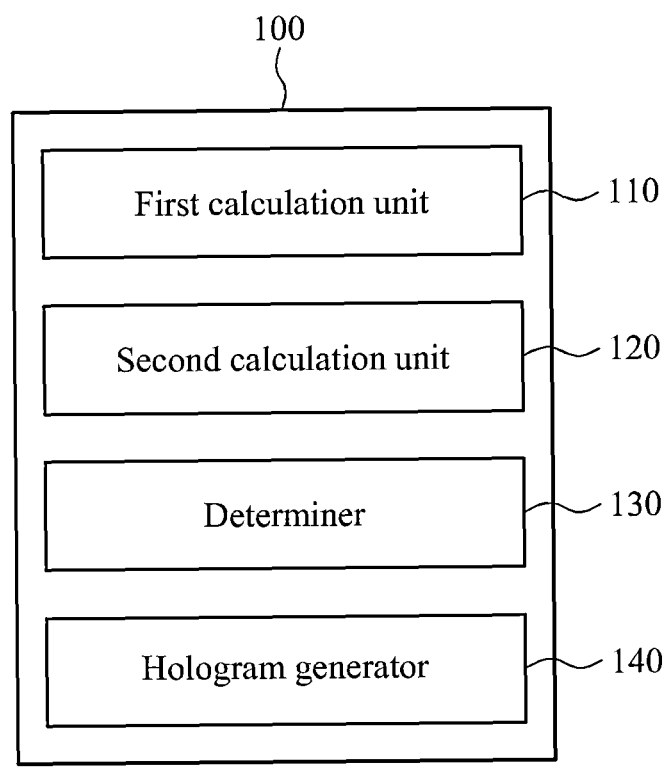
FIG. 1 illustrates an example of a hologram generation apparatus, according to example embodiments.

Reference will now be made in detail to embodiments, examples of which are illustrated in the accompanying drawings, wherein like reference numerals refer to like elements throughout. Example embodiments are described below to explain the present disclosure by referring to the figures.

In addition, terms used herein are defined to appropriately describe the exemplary embodiments of the present disclosure, and thus, may be changed depending on a user, the intent of an operator, or a custom. Accordingly, the terms must be defined based on the following overall description of this specification.

FIG. 1 illustrates an example of a hologram generation apparatus 100, according to example embodiments.

Referring to FIG. 1, the hologram generation apparatus 100 may include a first calculation unit 110, a second calculation unit 120, a determiner 130, and a hologram generator 140. Each of these units may include at least one processing device.

In a process of generating a real time hologram pattern by a hologram generation apparatus, an excessive amount of calculation may be required when a number of points used for a three-dimensional (3D) object expression increases. When the hologram generation apparatus generates a hologram, light may be diffracted from a spatial light modulator (SLM) so as to bring about an offset or constructive interference. In this instance, a diffraction angle of the light may be inversely proportional to a size of a pixel of the SLM. However, limitations on reducing the size of the pixel of the SLM may exist, and a maximum diffraction angle may be provided to be approximately less than 10 degrees (°) with a size of approximately 10 micrometers (μm). Thus, extending a viewing angle in a hologram display may be difficult.

According to example embodiments of the present disclosure, when the hologram generation apparatus 100 generates a hologram in a sub-hologram area corresponding to an eye position of a viewer using a viewpoint tracing process, a complexity or a number of calculations performed for generating the hologram pattern may be reduced, and thus, a wide-view hologram display may be realized.

That is, the sub-hologram area may indicate a portion of an entire SLM area. For example, when a pattern is generated with respect to the entire SLM area to generate a single hologram object, a number of calculations may be substantially increased. Thus, the pattern may be generated with respect to the portion of the entire SLM area, and the portion may be referred to as a sub-hologram area.

Although a position of the sub-hologram area may be determined based on the hologram object, or using the viewpoint tracing process based on the eye position of the viewer, a size of the sub-hologram area may vary based on a method used for determining the sub-hologram area. As described above, a complexity or a number of calculations performed for generating the hologram pattern may be reduced according to a decrease in a size of the sub-hologram area corresponding to the hologram object used for generating the hologram pattern. The hologram object may be a hologram point or a set of hologram points.

The method of determining the sub-hologram area may include a method of determining, as the sub-hologram area corresponding to the hologram object, an area of an SLM to which light incident to a user viewing window is projected, in a process of generating a hologram, or a method of determining the sub-hologram area based on a sampling limit determined based on a size of a SLM pixel.

The size of the sub-hologram area corresponding to the hologram object may vary based on the two methods. Thus, a process of calculating the size of the sub-hologram area determined using both methods and comparing results of the calculating may be necessary in order to determine a sub-hologram area on which a number of calculations performed for generating a hologram pattern, for example, a sub-hologram area having a minimum size, from the sub-hologram area corresponding to the hologram object.

The first calculation unit 110 may calculate a size of a first sub-hologram area corresponding to a first hologram object using a viewing window. When a size of the viewing window is determined for a corresponding eye position, the first calculation unit 110 may determine an area of an SLM from which light is projected onto the viewing window by passing through a hologram point, to be the first sub-hologram area. For example, the first calculation unit 110 may calculate the size of the first sub-hologram area based on geometrical relationships among the size and the position of the viewing window, and a position of the first hologram object.

The second calculation unit 120 may calculate a size of a second sub-hologram area corresponding to the first hologram object based on a size of a display pixel. A frequency of a spherical wave occurring in the first hologram object may be increased according to an increase in a distance from a point of an SLM surface, vertically corresponding to the hologram object. When the frequency exceeds a range by which a sampling of the size of the SLM pixel is possible, aliasing may occur, and thus, degradation in an image may occur in a process of restoring a hologram. Accordingly, an area satisfying a Nyquist sampling may be determined to be the second sub-hologram area. For example, the second calculation unit 120 may calculate the size of the second sub-hologram area based on a sampling limit of the size of the display pixel.

The first calculation unit 110 and the second calculation unit 120 may also calculate a position of the first sub-hologram area and a position of the second sub-hologram area. For example, the position of the sub-hologram area in the entire SLM area may be calculated using the viewpoint tracing process subsequent to recognizing the eye position of the viewer. Although the position of the sub-hologram area is determined using the viewpoint tracing process in this example, the position of the sub-hologram area may also be determined using various other processes, and thus, the present disclosure is not limited thereto.

The determiner 130 may compare the size of the first sub-hologram area and the size of the second sub-hologram area, and determine a sub-hologram area corresponding to the first hologram object based on a result of the comparing. A sub-hologram area on which calculations for generating a hologram pattern are performed may be determined by comparing the size of the first sub-hologram area and the size of the second sub-hologram area calculated by the first calculation unit 110 and the second calculation unit 120, respectively.

The determiner 130 may compare the size of the first sub-hologram area and the size of the second sub-hologram area and may determine one of these as the sub-hologram area corresponding to the hologram object, thereby reducing a number of calculations performed for generating the hologram pattern. Thus, added ease in real time hologram generation may be realized when compared to a conventional hologram generation apparatus.

According to example embodiments of the present disclosure, the determiner 130 may determine a sub-hologram area having a minimum size between the first sub-hologram area and the second sub-hologram area, to be the sub-hologram area corresponding to the hologram object based on results of the comparing. Since calculations may be performed on the sub-hologram area having a minimum size to obtain the hologram pattern, a number of calculations may be reduced in comparison to calculations performed on a sub-hologram area determined using another process. Although in this example the sub-hologram area corresponding to the hologram object is determined to be the sub-hologram area having a minimum or smaller size in order to minimize a process of calculation for generating the hologram pattern, the sub-hologram area corresponding to the hologram object may be determined using various processes.

The hologram generator 140 may generate a point-hologram for the determined sub-hologram area, and generate a hologram pattern by accumulating results of the generated point-holograms. The hologram pattern may be generated for the determined sub-hologram area, in lieu of the entire SLM area. Thus, a number of 3D object points to be expressed may be reduced when compared to generating the hologram pattern for the entire SLM area. Since a complexity and number of calculations are determined based on the number of 3D object points, the complexity and number of calculations to be performed may also be reduced.

In addition, since the sub-hologram area that may minimize the complexity and number of calculations is determined by comparing sub-hologram generation methods, the complexity and number of calculations may be reduced in comparison to a hologram generation apparatus using a conventional sub-hologram area. Further, the position of the sub-hologram may be determined by tracing a viewpoint of a viewer, and thus, a wide viewing display may be realized despite a relatively large size of the SLM pixel.

Figure 2:
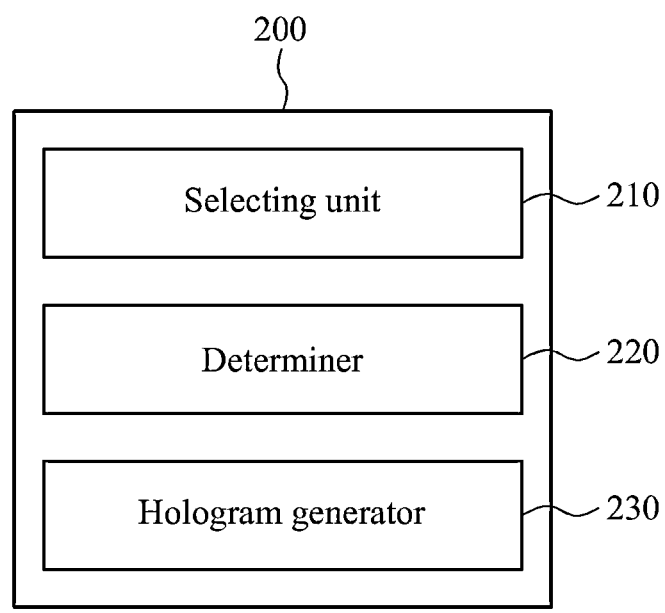
FIG. 2 illustrates another example of a hologram generation apparatus, according to example embodiments.

FIG. 2 illustrates another example of a hologram generation apparatus 200, according to example embodiments.

Referring to FIG. 2, the hologram generation apparatus 200 may include a selecting unit 210, a determiner 220, and a hologram generator 230. Each of the units of the hologram generation apparatus 200 may include at least one processing device. Descriptions about a function of the hologram generator 140 of FIG. 1 may be similarly applied to a function of the hologram generator 230 of FIG. 2, however, the present disclosure is not limited thereto. As such, repeated descriptions will be omitted for conciseness and ease of description.

The selecting unit 210 may select a method of determining a sub-hologram area based on a position of a hologram object relative to a display. The method of determining a sub-hologram area may include a first method for determining the sub-hologram area using a user viewing window, and a second method for determining the sub-hologram area based on a size of a display pixel.

As described in FIG. 1, the sub-hologram area determined using the first method and the second method may have varying sizes based on the position of the hologram object. For example, the size of the sub-hologram area determined using the first method and the second method may vary based on a depth value of the hologram object, such as, a distance in a vertical direction relative to a display.

When the first method is used to determine the sub-hologram area using a viewing window, the size of the sub-hologram area may be determined based on geometrical relationships among a size and a position of the viewing window, and the position of the hologram object. Since the size and the position of the viewing window are determined in advance of determining the size of the sub-hologram area, the size of the sub-hologram area may be determined based on the position of the sub-hologram area.

When the second method is used to determine the sub-hologram area based on a size of a display pixel, the size of the sub-hologram area may be determined using a sampling limit determined based on the size of the display pixel. A wavelength of a spherical wave of the hologram object incident to an SLM surface may be increased according to a distance from the position of the hologram object being increased in a vertical direction relative to the display. In response to the increase, a number of pixels required to reach a sampling limit frequency of the pixel may also be increased. For example, since an increased number of samples may be required to calculate a hologram pattern, the size of the sub-hologram area may be increased based on the position of the sub-hologram object, such as, the depth value of the sub-hologram object.

Figure 3:
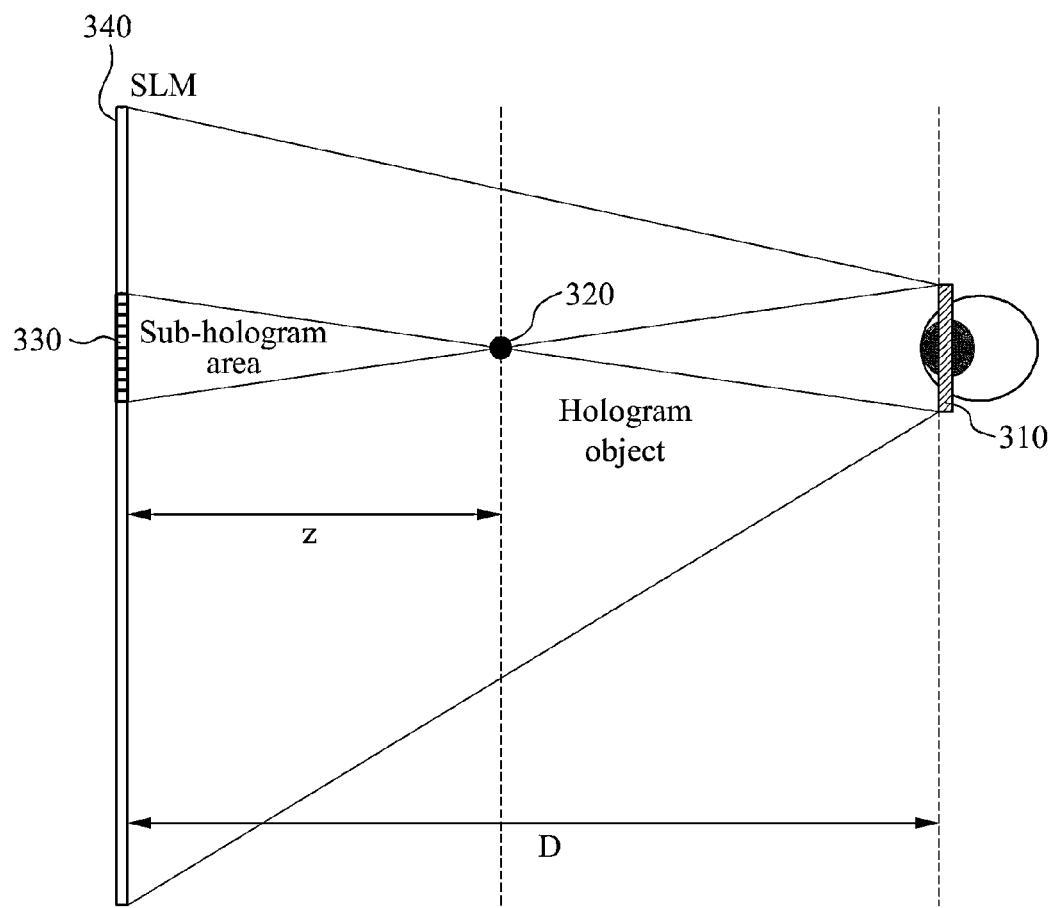
FIG. 3 illustrates a method of calculating a size of a sub-hologram area using a viewing window, according to example embodiments.
Figure 4:
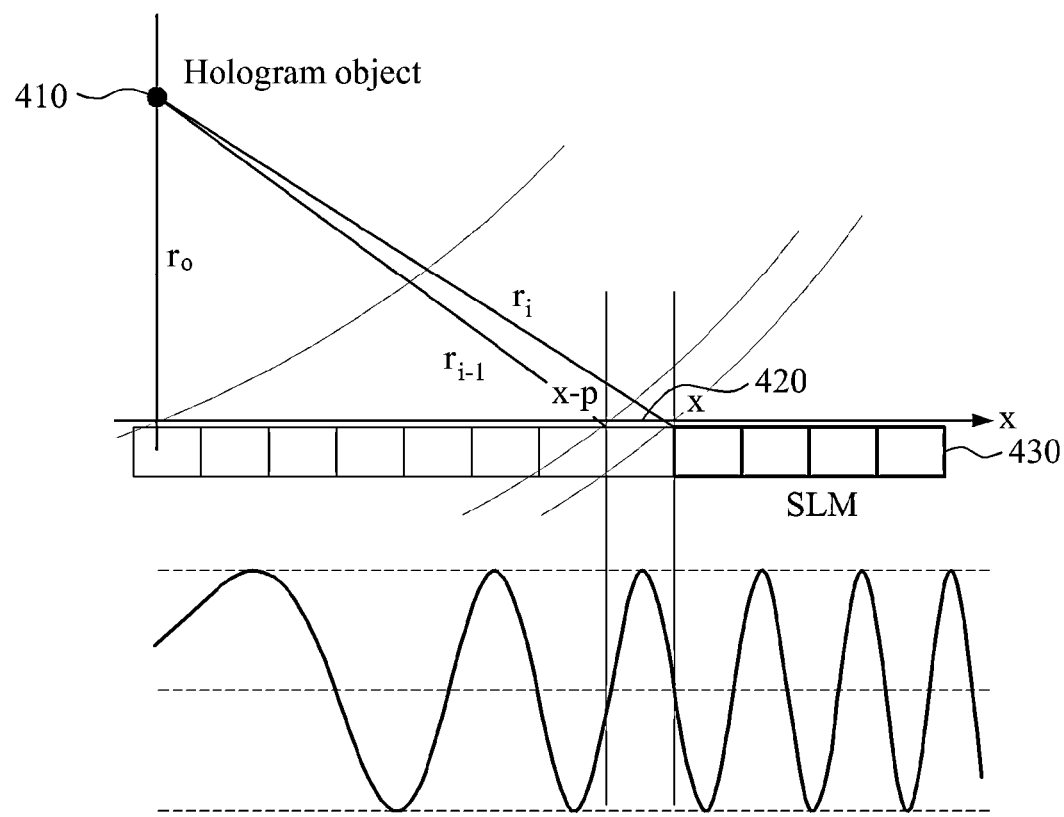
FIG. 4 illustrates a method of calculating a size of a sub-hologram area based on a sampling limit of a display pixel, according to example embodiments.

Descriptions about a method of determining the size of the sub-hologram area based on the position of the hologram object in the first method and the second method will be provided with reference to FIGS. 3 and 4.

The sub-hologram area determined using each of the first method and the second method may have relatively varied sizes, based on a threshold position. For example, the threshold position may be a position of the hologram object in which the size of the sub-hologram area determined using the first method is greater than the size of the sub-hologram area determined using the second method, or vice versa.

Since the size of the sub-hologram area determined using both methods may vary based on the size of the viewing window or the size of the SLM pixel, the threshold position may also be changed. Thus, a point at which the relative size of the sub-hologram area is changed may be set, in advance, to be the threshold position. Subsequently, the position of the hologram object may be compared to the threshold position, and the method of determining the sub-hologram area may be selected.

As a non-limiting example, in an interval in which the hologram object is positioned within a distance less than the threshold position, the size of the sub-hologram area determined using the first method may be less than the size of the sub-hologram area determined using the second method. In this case, the sub-hologram area may be determined using the second method to minimize a number of calculations performed for generating a hologram pattern.

Conversely, as another non-limiting example, in an interval in which the hologram object is positioned at a distance greater than or equal to the threshold position, the size of the sub-hologram area determined using the second method may be less than the size of the sub-hologram area determined using the first method. In this case, the sub-hologram area may be determined using the first method to minimize a number of calculations performed for generating a hologram pattern.

Based on a result of comparing the threshold position and the position of the sub-hologram object relative to the display, the selecting unit 210 may select a method to determine the sub-hologram area in order to minimize a number of calculations performed for generating the hologram pattern. For example, a sub-hologram area on which a number of calculations performed for generating the hologram pattern may be a sub-hologram area having a minimum or smaller size between the sub-hologram areas determined using the two methods.

The determiner 220 may determine a sub-hologram area corresponding to the hologram object using the method of determining the sub-hologram area selected by the selecting unit 210. The determiner 220 may determine the sub-hologram area on which a number of calculations are performed for generating the hologram pattern by calculating the size of the sub-hologram area determined using both methods, without a direct comparison.

Although the sub-hologram area is determined using an identical method, the size of the sub-hologram area may vary based on the size of the viewing window and the size of the SLM pixel. Thus, the hologram generation apparatus 200 may consider varying the size of the sub-hologram area based on the size of the viewing window and the size of the SLM pixel, in order to select a method to determine the sub-hologram area and the sub-hologram area.

FIG. 3 illustrates a method of calculating a size of a sub-hologram area 330 using a viewing window 310, according to example embodiments.

The method of calculating the sub-hologram area 330 corresponding to a hologram object 320 using the viewing window 310 may be provided with reference to FIG. 3. In the method, the size of the sub-hologram area 330 may be calculated based on geometrical relationships among a size and the position of the viewing window 310, and a position of the hologram object 320.

In advance of calculating the size of the sub-hologram area 330, an eye position of a viewer may be recognized to determine the size and the position of the viewing window with respect to an area of the corresponding eye position. The size of the viewing window 310 may be determined based on a distance D between an SLM surface 340 and the viewing window 310. Based on the determined size and position of the viewing window 310, the sub-hologram area 330 may be calculated such that light concentrated on the hologram object 320 is projected onto the viewing window 310.

For example, when the light concentrated on the hologram object 320 reaches a portion of an edge of the viewing window 310, a portion of the SLM surface 340 through which the light passes may correspond to an edge of the sub-hologram area 330. Through this, the edge of the sub-hologram area 330 may be determined, and thus, the size of the sub-hologram area 330 may be calculated.

In FIG. 3, a virtual straight line passing from the edge of the viewing window 310 through the hologram object 320 may be considered, and the virtual straight line may correspond to a route along which light travels. A point at which the SLM surface 340 intersects the virtual straight line passing through the hologram object 320 may be set to be the edge of the sub-hologram area 330. Through this, the sub-hologram area 330 may be determined, and thus, the size of the sub-hologram area 330 may be calculated.

Through the above descriptions, a change in a size of the sub-hologram area 330 based on the position of the hologram object 320 may be indicated. When a distance z between the hologram object 320 and the SLM surface 340 is increased, an inclination of the virtual straight line set to pass from the edge of the viewing window 310 through the hologram object 320 may be increased. The size of the sub-hologram area 330 including the point at which the virtual straight line intersects the SLM surface 340 may be increased according to the increase in the inclination of the virtual straight line.

Conversely, when the distance z between the hologram object 320 and the SLM surface 340 is decreased, the inclination of the virtual straight line set to pass from the edge of the viewing window 310 through the hologram object 320 may be decreased. The size of the sub-hologram area 330 including the point at which the virtual straight line intersects the SLM surface 340 may be decreased according to the decrease in the inclination of the virtual straight line.

In FIG. 3, a method of calculating the sub-hologram area 330 when the distance z between the hologram object 320 and the SLM surface 340 is positive based on the SLM surface 340 may be indicated. Although not shown, the size of the sub-hologram area 330 may also be calculated using the aforementioned method when the distance between the hologram object 320 and the SLM surface 340 is negative, with respect to the SLM 340.

When the distance z between the hologram object 320 and the SLM surface 340 is negative with respect to the SLM 340, a virtual straight line passing from the edge of the viewing window 310 through the hologram object 320 may be set. The virtual straight line may correspond to a route along which light travels. In comparison to the case in which the distance between the hologram object 320 and the SLM surface 340 is positive, a difference may be present in points at which the virtual straight line intersects the SLM surface 340 before the virtual straight line passes through the hologram object 320. Despite such a difference, the point at which the virtual straight line intersects the SLM surface 340 may be identically set to be the edge of the sub-hologram area 330.

FIG. 4 illustrates a method of calculating a size of a sub-hologram area based on a sampling limit of a display pixel, according to example embodiments.

Referring to FIG. 4, a method of calculating the size of the sub-hologram area corresponding to a hologram object 410 based on a size of an SLM pixel 420 may be indicated. In the method, the size of the sub-hologram area may be calculated based on the sampling limit determined based on the size of the SLM pixel 420, and a position of the hologram object 410.

A frequency of a spherical wave occurring in the hologram object 410 may be increased according to an increase in a distance from a point of an SLM surface 430, vertically corresponding to the hologram object 410. When an increase in the frequency exceeds a range by which a sampling is possible based on the size of the SLM pixel 420, aliasing may occur, and thus, degradation in an image may be caused in a process of restoring a hologram. Accordingly, to prevent an occurrence of the degradation in an image, an area satisfying a Nyquist sampling may be determined to be the sub-hologram area.

In FIG. 4, the frequency of the spherical wave of the hologram object 420 may be increased according to an increase in a distance from a point of the SLM surface 430, vertically corresponding to the hologram object 410. When the frequency of the spherical wave of the hologram object 410 is gradually increased, the frequency may correspond to the sampling limit in the SLM pixel 420. For example, the frequency of the spherical wave occurring in the hologram object 410 of the SLM pixel 420 may be the area satisfying the Nyquist sampling.

In FIG. 4, each of $r_o$, $r_i$, and $r_{i-1}$ denotes a radius of the spherical wave occurring in the hologram object 410. $r_o$ may indicate a vertical distance z of Equation 1 between the hologram object 410 and the SLM surface 430, and each of $r_o$ and $r_i$ may indicate a distance between the hologram object 410 and each edge of the SLM pixel 420. The distance may be obtained as shown in Equation 1.

$$r_i = \sqrt{z^2 + x^2}$$

$$r_{i-1} = \sqrt{z + (x-p)^2} \qquad \text{[Equation 1]}$$

In Equation 1, p denotes the size of the SLM pixel 420, and x may indicate a distance from a point of the SLM surface 430, vertically corresponding to the hologram object 410, to the pixel satisfying the Nyquist sampling. Thus, $r_i$ and $r_{i-1}$ may satisfy a condition shown in Equation 2.

$$r_i - r_{i-1} = \frac{\lambda}{2} \qquad \text{[Equation 2]}$$

Based on Equation 1 and Equation 2, the size of the sub-hologram area may be determined as shown in Equation 3.

$$\text{Size of sub-hologram area} = \frac{\lambda \cdot z}{2p} \qquad \text{[Equation 3]}$$

In Equation 3, $\lambda$ denotes a wavelength of light (also in Equation 2), p may be determined during fabrication of an SLM and thus, $\lambda$ and p may be constant. Accordingly, the size of the sub-hologram area may be determined based on the vertical distance z between the SLM surface 430 and the hologram object 410. The size of the sub-hologram area may be increased according to an increase in the vertical distance z between the SLM surface 430 and the hologram object 410, and the size of the sub-hologram area may be decreased according to a decrease in the vertical distance z between the SLM surface 430 and the hologram object 410.

Figure 5A:
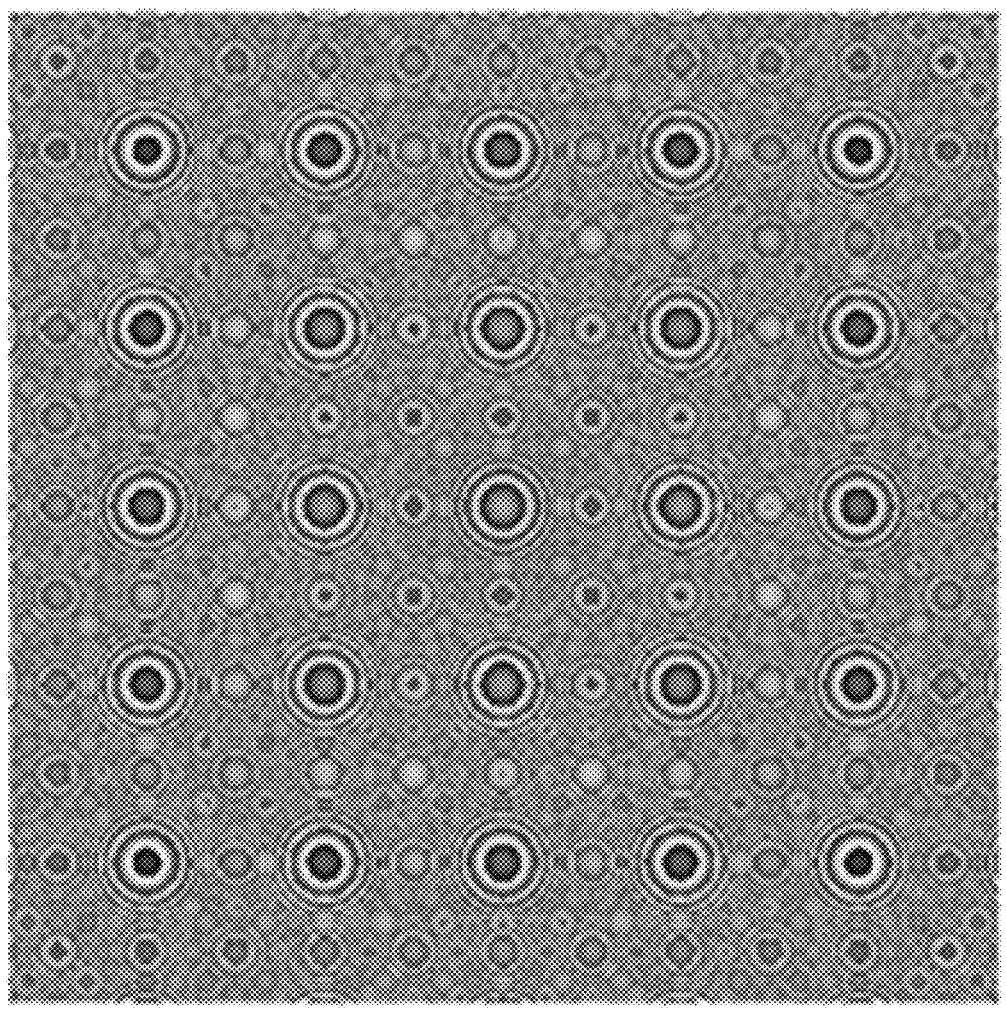
FIGS. 5A and 5B illustrate an example of aliasing occurring due to a sampling limit of a display pixel and an example of generating a sub-hologram area using the sampling limit of the display pixel, respectively, according to example embodiments.
Figure 5B:
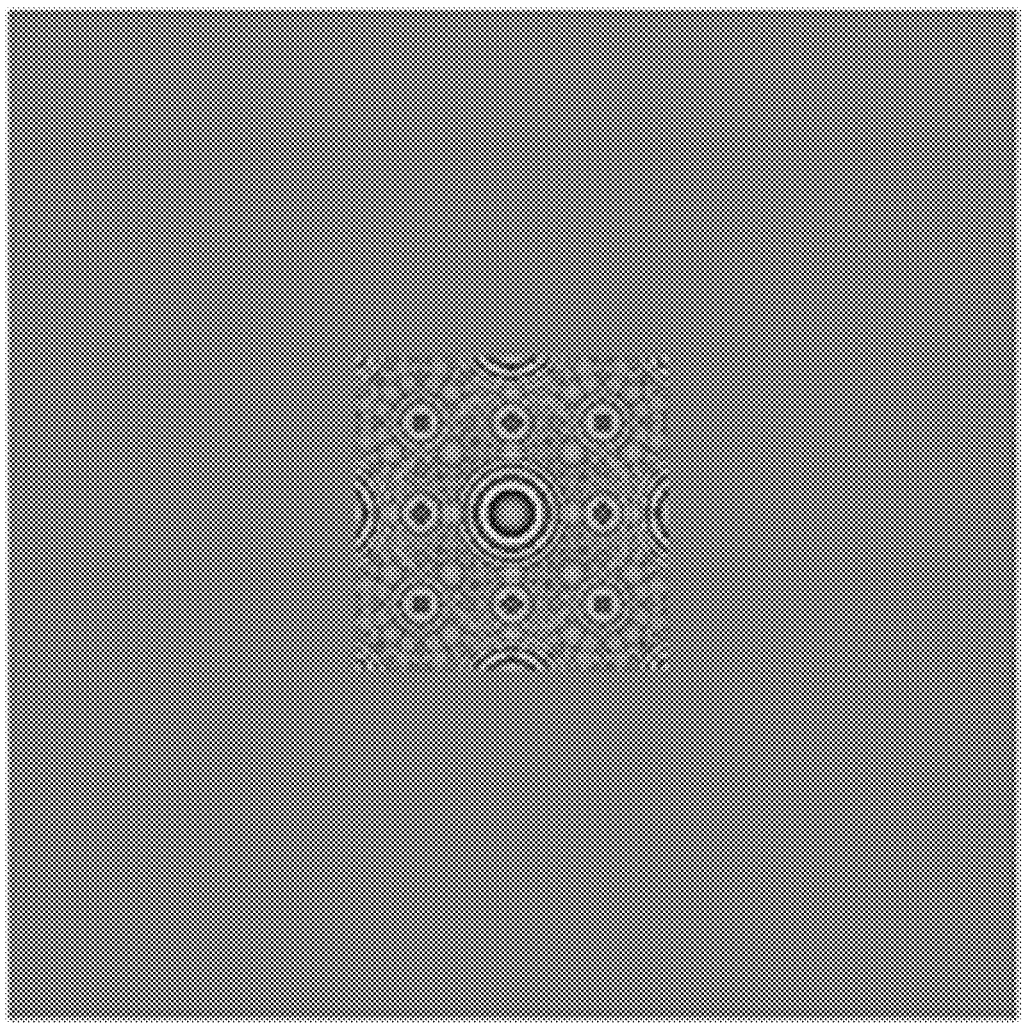

FIGS. 5A and 5B illustrate an example of aliasing occurring due to a sampling limit of a display pixel and an example of generating a sub-hologram area using the sampling limit of the display pixel according to example embodiments.

Referring to FIG. 5A, when a point-hologram is generated with respect to an entire SLM area, aliasing may occur in a hologram pattern due to a sampling limit of an SLM pixel. As described in FIG. 4, a frequency of the point-hologram information may be increased according to an increase in a distance from a point of the SLM surface 430, vertically corresponding to the hologram object 410. Thus, when the sampling limit of the SLM pixel is exceeded, the aliasing may occur, thereby causing degradation in a clearness of an image in a process of restoring a hologram.

Referring to FIG. 5B, a sub-hologram area may be determined in consideration of the sampling limit determined based on a size of the SLM pixel, and a point-hologram pattern may be generated with respect to the sub-hologram area.

In comparison between FIG. 5A and FIG. 5B, a hologram displayed within an area satisfying the sampling limit based on a point of the SLM surface 430, vertically corresponding to the hologram object 410 as a center, may be restored in a relatively high clearness. However, clarity of the restored hologram may decrease according to an increase in a distance from a point of the SLM surface 430, vertically corresponding to the hologram object 410.

Accordingly, a point-hologram pattern generated by determining a sub-hologram area may provide an increased clarity when compared to a point-hologram pattern generated with respect to an entire SLM area.

Figure 6:
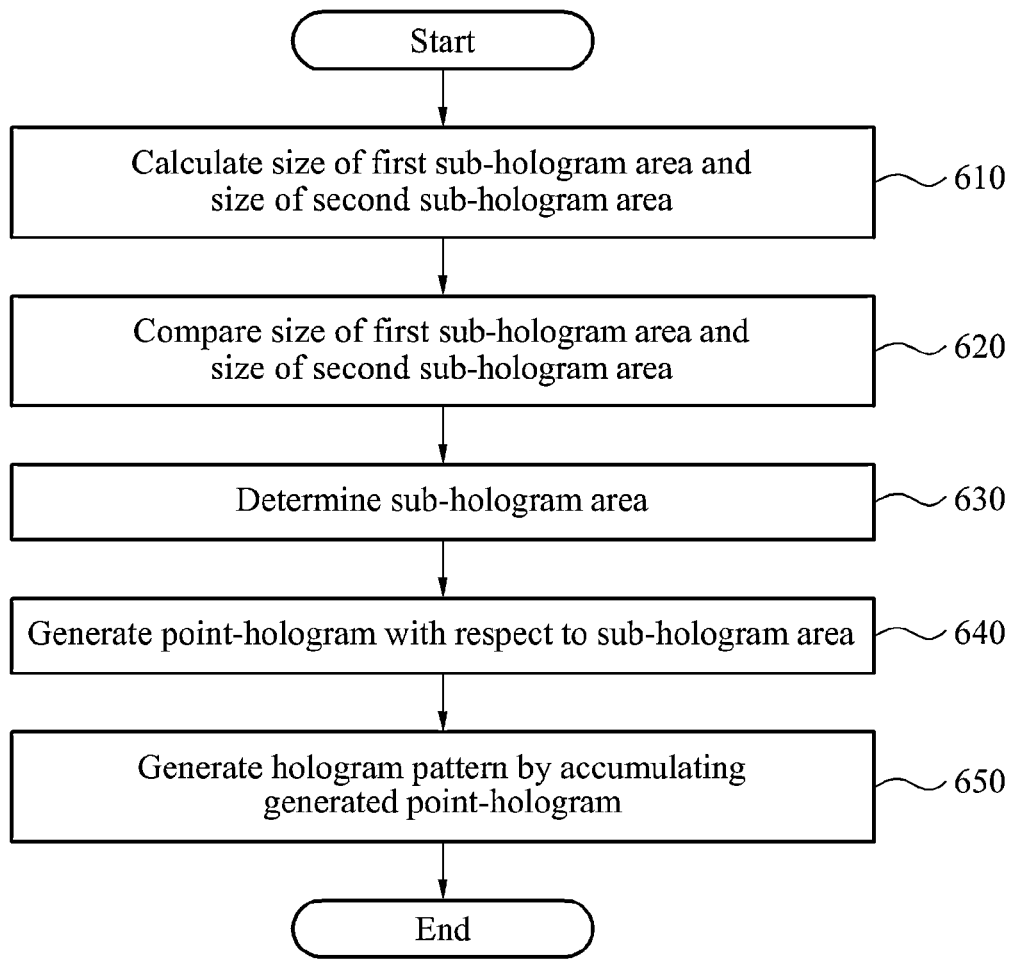
FIG. 6 is a flowchart illustrating an example of a hologram generation method, according to example embodiments.

FIG. 6 illustrates an example of a hologram generation method, according to example embodiments.

In operation 610, the first calculation unit 110 may calculate a size of a first sub-hologram area corresponding to a hologram object using a user window, and a second calculation unit 120 may calculate a size of a second sub-hologram area corresponding to the hologram object based on a size of a display pixel.

A hologram generation apparatus may employ the method of determining a sub-hologram area using a viewing window of FIG. 3 and the method of determining a sub-hologram area using a sampling limit of FIG. 4. Thus, a size of the sub-hologram area corresponding to the hologram object may vary depending on the two methods. In addition, to reduce a complexity and number of calculations performed for generating a hologram pattern, a comparison between sub-hologram areas determined using the two methods may be required. Thus, the size of the sub-hologram area may be calculated using both methods.

In operation 620, the determiner 130 may compare the size of the first sub-hologram area and the size of the second sub-hologram area. As described above, the sub-hologram areas determined using the two methods may be compared to each other to reduce a complexity and number of calculations performed for generating the hologram pattern.

In operation 630, the determiner 130 may determine the sub-hologram area based on a result of the comparing. Based on the result of the comparing, the determiner 130 may determine a sub-hologram area on which a number of calculations performed for generating the hologram pattern is minimized between the first sub-hologram area and the second sub-hologram area, to be the sub-hologram area. For example, a sub-hologram area having a minimum size between the first sub-hologram area and the second sub-hologram area may be determined to be the sub-hologram area corresponding to the hologram object.

In operation 640, the hologram generator 140 may generate a point-hologram with respect to the determined sub-hologram area. Since a calculation for generating the hologram pattern may be performed on the determined sub-hologram area in lieu of an entire SLM area, a complexity and number of the calculations may be reduced.

In operation 650, the hologram generator 140 may generate a hologram pattern by accumulating the generated point-hologram. Since the hologram pattern is generated by accumulating the generated point-hologram and the calculation for generating the hologram pattern is performed on the sub-hologram area, a real time digital hologram may be generated.

Figure 7:
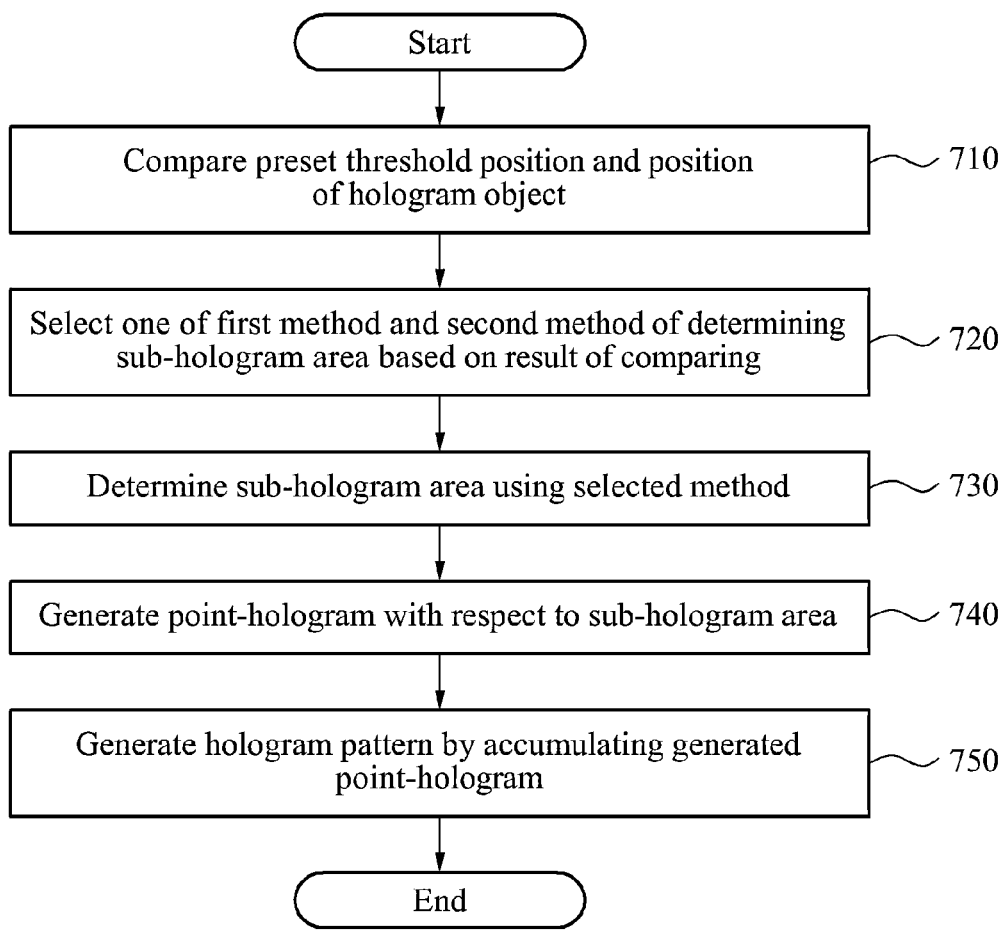
FIG. 7 is a flowchart illustrating another example of a hologram generation method, according to example embodiments.

FIG. 7 illustrates another example of a hologram generation method, according to example embodiments.

In operation 710, the selecting unit 210 may compare a preset threshold position and a position of a hologram object based on a display. A method of determining a sub-hologram area may include a first method of determining the sub-hologram area using a user viewing window, and a second method of determining the sub-hologram area based on a size of a display pixel. The preset threshold position may be a position at which a size of the sub-hologram area determined using the first method is greater than a size of the sub-hologram area determined using the second method. Thus, to select a sub-hologram area upon which a number of calculations is performed for generating a hologram pattern, the preset threshold position may be compared to the position of the hologram object.

In operation 720, the selecting unit 210 may select one of the first method and the second method to determine the sub-hologram area corresponding to the hologram object based on the result of the comparing. As described above, to minimize a number of the calculations performed for generating the hologram pattern, the selecting unit 210 may select a method of minimizing a size of a sub-hologram area between the first method and the second method.

When information such as a size of a viewing window and a size of a display pixel is provided, for example, a position at which the size of the sub-hologram area determined using the first method is greater than the size of the sub-hologram area determined using the second method may be recognized. Thus, a method for determining the sub-hologram area upon which a complexity and number of calculations is performed for generating the hologram pattern may be selected without a need to calculate all sizes of the sub-hologram areas determined using the first method and the second method.

In operation 730, the determiner 220 may determine the sub-hologram area corresponding to the hologram object using the selected method. Since the method of determining the sub-hologram area by comparing the preset threshold position and the position of the hologram object to minimize a complexity and a number of calculations performed for generating the hologram pattern is selected, the sub-hologram area may be determined using the selected method. A size of the sub-hologram area determined using the selected method may be less than a size of a sub-hologram area determined using another method, and thus, a complexity and a number of calculations performed for generating the hologram pattern may be reduced.

In operation 740, the hologram generator 230 may generate a point-hologram with respect to the determined sub-hologram area. Since calculations for generating the hologram pattern are performed on the determined sub-hologram area in lieu of an entire area of an SLM, a complexity and number of calculations performed for generating the hologram pattern may be reduced.

In operation 750, the hologram generator 230 may generate a hologram pattern by accumulating the generated point-hologram. Since the hologram pattern is generated by accumulating the point-hologram generated with respect to the hologram object and the calculation for generating the hologram pattern is performed on the determined sub-hologram area, a real time digital hologram may be generated.

The units described herein may be implemented using hardware components and software components. For example, the hardware components may include microphones, amplifiers, band-pass filters, audio to digital convertors, and processing devices. A processing device may be implemented using one or more general-purpose or special-purpose computers, such as, for example, a processor, a controller and an arithmetic logic unit (ALU), a digital signal processor, a microcomputer, a field programmable array (FPA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements or devices and multiple types of processing elements or devices. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. In particular, the software and data may be stored by one or more computer readable recording mediums.

The method according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy discs, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Further, according to an aspect of the embodiments, any combinations of the described features, functions and/or operations may be provided.

Moreover, the sub-hologram generation apparatus, as discussed above, may include at least one processor to execute at least one of the above-described units and methods.

Thus, other implementations, alternative embodiments and equivalents to the claimed subject matter are construed as being within the appended claims.

What is claimed is:

1. A sub-hologram generation apparatus, comprising:
   a first calculator configured to calculate a size of a first sub-hologram area corresponding to a first hologram object using a user viewing window;
   a second calculator configured to calculate a size of a second sub-hologram area corresponding to the first hologram object, based on a size of a display pixel; and
   a determiner configured to compare the calculated size of the first sub-hologram area and the calculated size of the second sub-hologram area, and to determine a sub-hologram area corresponding to the first hologram object based on a result of the comparing,
   wherein the determiner is configured to determine, as the sub-hologram area corresponding to the first hologram object, a sub-hologram area upon which a number of calculations performed for generating a hologram pattern is minimized between the first sub-hologram area and the second sub-hologram area.

2. The apparatus of claim 1, wherein the first calculator is configured to calculate the size of the first sub-hologram area based on geometrical relationships among a size and a position of the user viewing window, and a position of the first hologram object.

3. The apparatus of claim 1, wherein the second calculator is configured to calculate the size of the second sub-hologram area in consideration of a sampling limit determined based on the size of the display pixel.

4. The apparatus of claim 3, wherein the size of the second sub-hologram area is determined based on a wavelength of light, a size of a spatial light modulator (SLM) pixel defined during fabrication of the SLM, and a vertical distance between the first hologram object and a surface of the SLM.

5. The apparatus of claim 3, wherein an area satisfying a Nyquist sampling is determined to be the second sub-hologram area, thereby preventing an occurrence of degradation in an image.

6. The apparatus of claim 3, wherein a point-hologram pattern generated by determining the second sub-hologram area provides an increased clarity in comparison to a point-hologram pattern generated with respect to an entire spatial light modulator (SLM) area.

7. The apparatus of claim 1, wherein the first calculator and the second calculator are configured to calculate a position of the first sub-hologram area and a position of the second sub-hologram area, respectively.

8. The apparatus of claim 1, wherein the determiner is configured to determine, as the sub-hologram area corresponding to the first hologram object, a sub-hologram area having a minimum or smaller size between the first sub-hologram area and the second sub-hologram area.

9. The apparatus of claim 1, further comprising:
   a hologram generator configured to generate a point-hologram with respect to the determined sub-hologram area, and to generate a hologram pattern by accumulating the generated point-hologram.

10. A sub-hologram determination method, comprising:
calculating a size of a first sub-hologram area corresponding to a first hologram object using a user viewing window;
calculating a size of a second sub-hologram area corresponding to the first hologram object based on a size of a display pixel; and
comparing the calculated size of the first sub-hologram area and the calculated size of the second sub-hologram area, and determining a sub-hologram area corresponding to the first hologram object based on a result of the comparing to minimize a number of calculations performed for generating a hologram pattern.

11. The method of claim 10, wherein the determining comprises determining, as the sub-hologram area, a sub-hologram area upon which a number of calculations performed for generating a hologram pattern is minimized between the first sub-hologram area and the second sub-hologram area.

12. The method of claim 10, wherein the determining comprises determining, to be the sub-hologram area, a sub-hologram area having a minimum or smaller size between the first sub-hologram area and the second sub-hologram area.

* * * * *